Jan. 12, 1926.

O. J. KUHLKE 1,569,551

VULCANIZER

Filed August 31, 1925    3 Sheets-Sheet 1

INVENTOR.
Otto J. Kuhlke.

BY
ATTORNEY.

Jan. 12, 1926.  
O. J. KUHLKE  
VULCANIZER  
Filed August 31, 1925   3 Sheets-Sheet 2
1,569,551
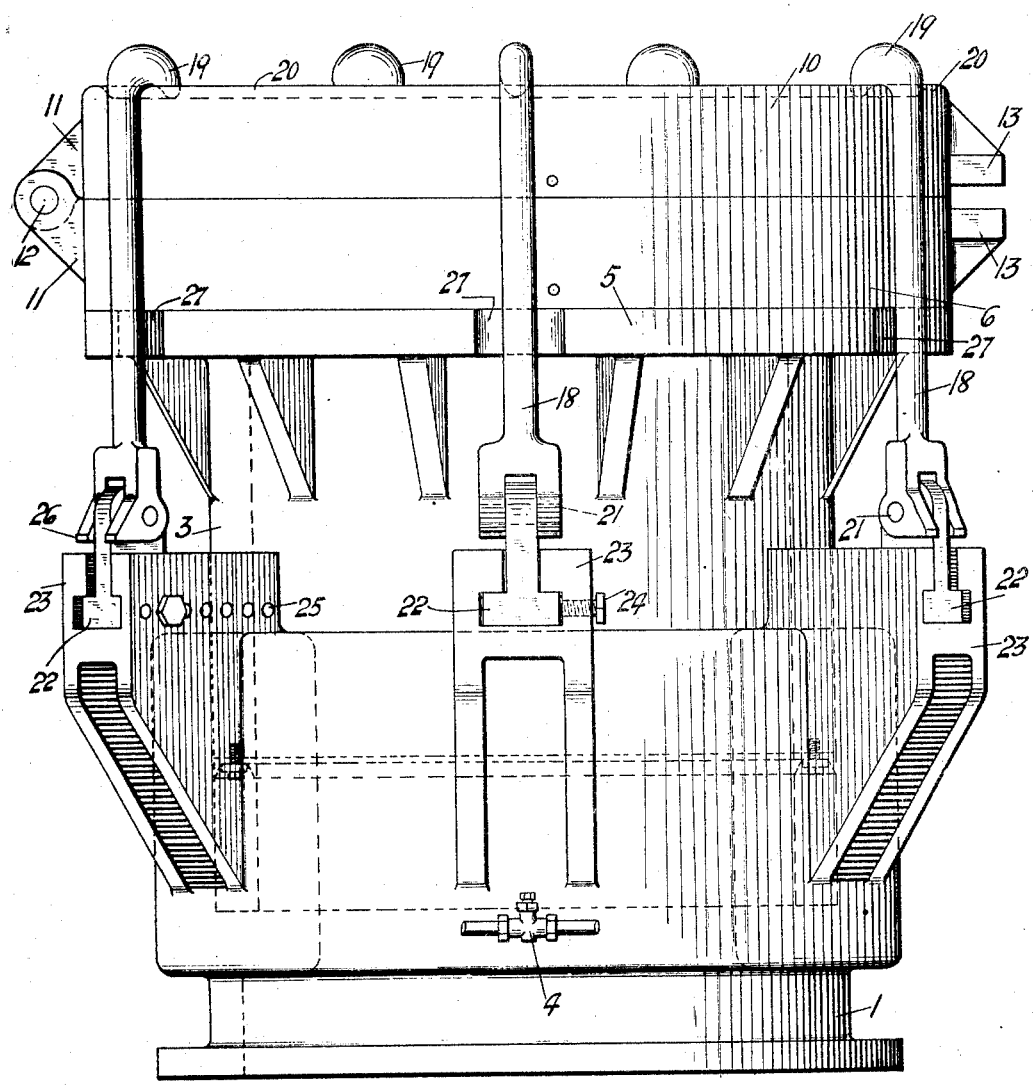
FIG-2
INVENTOR.
OTTO J. KUHLKE
BY
ATTORNEY.

Jan. 12, 1926.

O. J. KUHLKE 1,569,551

VULCANIZER

Filed August 31, 1925     3 Sheets-Sheet 3

INVENTOR.
OTTO J. KUHLKE.
BY
ATTORNEY.

Patented Jan. 12, 1926.

1,569,551

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

VULCANIZER.

Application filed August 31, 1925. Serial No. 53,489.

*To all whom it may concern:*

Be it known that I, OTTO J. KUHLKE, a citizen of the United States, and a resident of Akron, county of Summit, and State of Ohio, have invented certain new and useful Improvements in Vulcanizers, of which the following is a specification.

This invention relates to the art of vulcanizing rubber articles, such for example, as pneumatic tires, and particularly to that type of mold in which the articles are vulcanized individually, thereby securing economical and efficient operation, especially adapted for the manufacture of a large variety of sizes. While the invention is illustrated and described for the manufacture of tires, it will be understood that it may be modified for the manufacture of tubes, or other articles made of or containing rubber.

The object of the present invention is to simplify the operation of molds of the type in which the mold halves or sections are hinged together, and in which the molds are chambered or jacketed for the circulation of steam. These objects are accomplished in the construction which is shown and described, it being understood that changes and modifications may be made within the scope of the invention as set forth in the appended claims.

In the drawings:

Figure 2 is a side elevation; and

Figure 1:
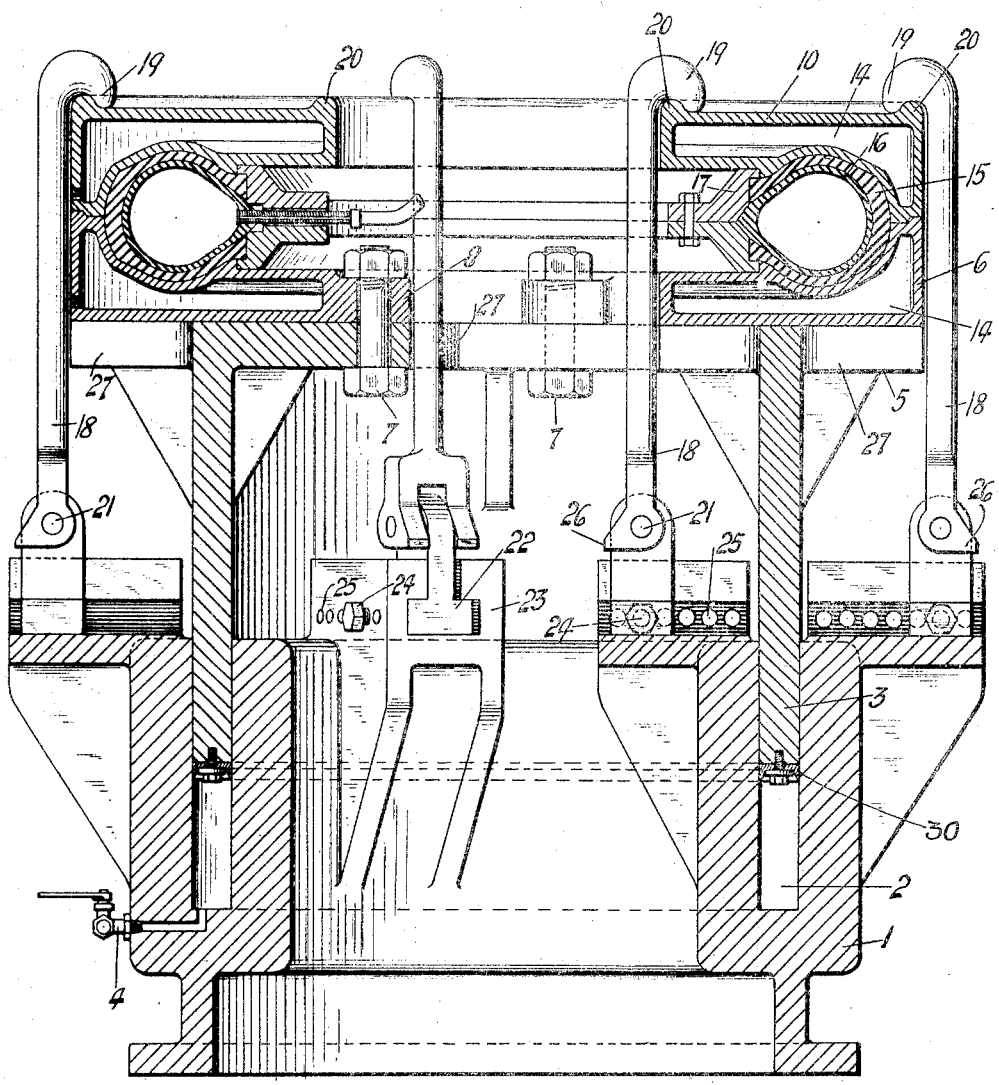
Figure 1 is a vertical section through the apparatus of the present invention on the line 1—1 of Figure 3.
Figure 3:
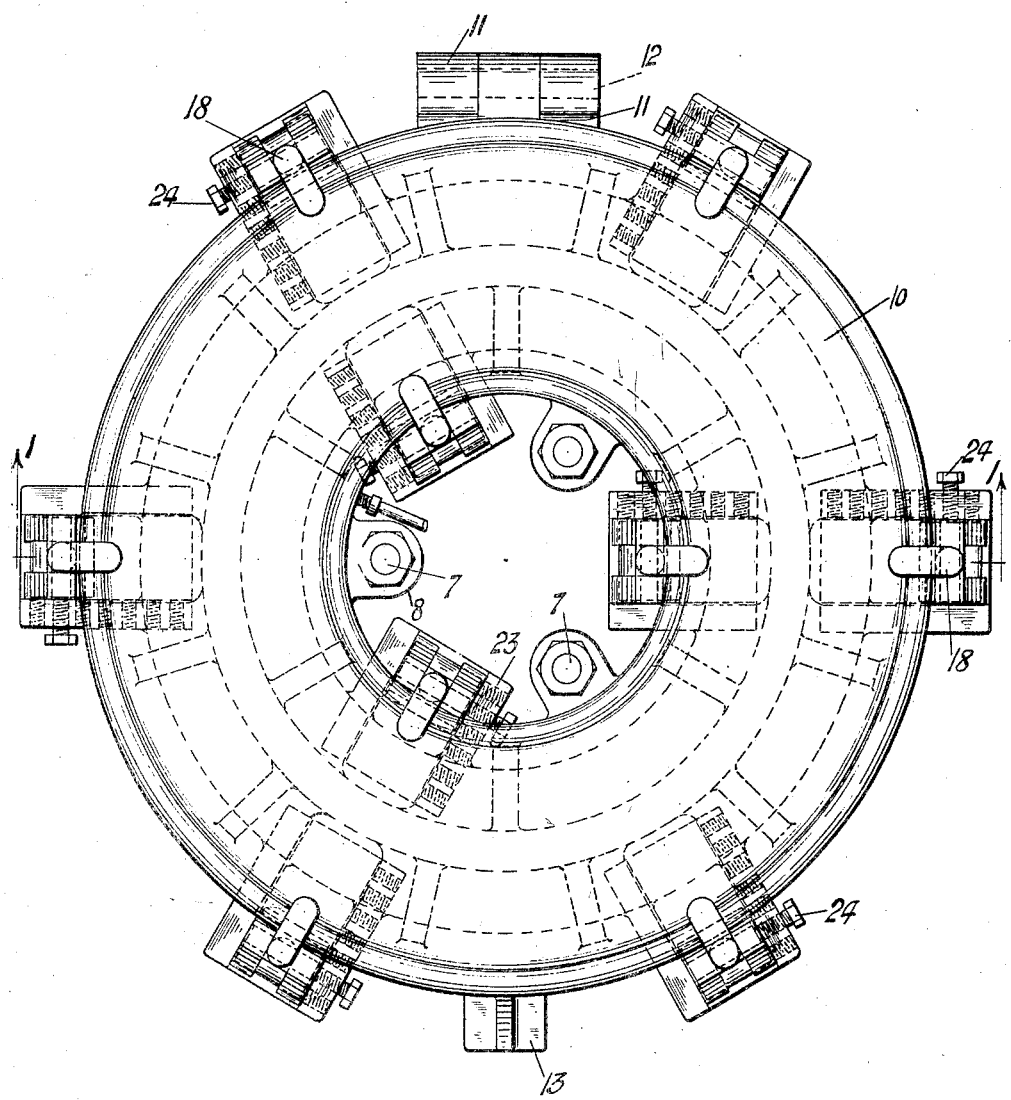
Figure 3 is a plan.

The present invention comprises a mold which is divided into upper and lower sections which are chambered for the circulation of steam, the sections being hinged together so as to facilitate the opening and closing thereof. The mold is carried upon a fluid operated ram, and the device is provided with hooks or grapples which serve to hold the sections together while the ram applies the pressure required to hold the molds together during the vulcanization of the articles contained therein. The mold is secured upon the ram by bolts or the like so that changes in molds may be easily made, and the device is thus particularly adaptable for factories requiring a relatively small production in a variety of sizes, although it may also be economically used on a single size at all times.

The apparatus comprises a standard or bed 1, which, in the preferred form illustrated, is formed with an annular groove or chamber 2 in which is slidably mounted a ring shaped ram 3 designed to be vertically moved by fluid pressure admitted through the valve 4 and carrying a packing gland 30 which seals the inner and outer peripheries of the ram.

Upon the upper surface of the ram is supported a table 5, to which is secured the lower section of the mold 6, here shown as a tire mold. The mold is secured by a plurality of bolts 7 which pass through apertures in a web 8 formed about the inner periphery of the opening in the center of the mold. The mold is thus readily replaceable by other molds of different sizes, or for the curing of different articles than tires.

The upper section of the mold is indicated by the numeral 10, the sections of the mold being formed with lugs 11 through which passes the hinge bolt 12 about which the upper section 10 may swing in opening the mold. Lugs 13 on the mold sections opposite the hinge may be used for prying the molds apart. The molds are chambered as at 14 for the circulation of steam for vulcanization. The tire is indicated at 15, the air bag at 16 and bead or clamping rings at 17.

When the mold is closed, the upper half is secured in position by a series of swinging clamps or grapples 18 arranged in two groups outside of and within the mold. The upper ends of the clamps extend over the mold and are provided with hooks 19 which engage ribs 20 about the inner and outer periphery of the mold. The clamps are carried upon horizontal pivots 21 which are located in T-shaped blocks 22, which are radially adjustable in correspondingly shaped slots in arms 23 projecting upwardly from the bed 1. The radial adjustment of the blocks is secured by set screws 24 which enter any of the series of recesses 25 formed in the base of the blocks 22. Lugs 26 limit the outward swinging movement of the clamp 18 and slots 27 are formed in the table through which the clamps may be moved.

The operation of the apparatus will be apparent without further description. It is particularly useful for the purposes set forth and permits of a large and economical production of tires, tubes or other articles.

Changes and modifications might be made within the scope of the invention. Instead, for example, of a single ring shaped chamber 2 and ram 3, a series of small rams arranged in a circle might be substituted, the useful feature of either construction being that the pressure is applied directly beneath the mold cavity, thus avoiding buckling of the apparatus or unequal pressure at any points thereof.

What is claimed is:

1. In an apparatus of the character set forth, a bed, a ring-shaped ram upon the bed, a table carried by the ram, a circular mold secured to the table above and in register with the ram, said mold comprising two sections hingedly secured together, and a plurality of clamps pivotally and adjustably secured upon the bed and adapted to be brought over the mold to hold the sections in closed position.

2. In an apparatus of the character set forth, a bed, fluid pressure operated mechanism upon the bed, a mold carried upon said mechanism, said mold comprising two sections, a plurality of blocks radially adjustable in the bed, and clamps pivotally mounted in said blocks and engageable over the top of the mold.

3. In an apparatus of the character set forth, a bed, fluid pressure operated mechanism upon the bed, a mold carried upon said mechanism, said mold comprising two sections hingedly connected, a plurality of blocks radially adjustable in the bed, and clamps pivotally mounted in said blocks and engageable over the top of the mold.

4. In an apparatus of the character set forth, a bed, fluid pressure operated mechanism upon the bed, a mold located above and in register with the said mechanism, said mold comprising two sections which are hingedly connected, a plurality of blocks radially adjustable in the bed, and clamps carried upon said blocks and movable over the top of the mold.

5. In apparatus of the character described, an annular pressure chamber, a ring-shaped ram within the pressure chamber, a packing around the inner and outer peripheries of the ram, a ring-shaped pressure plate carried by the ram, a tire mold in register with the plate, and means to clamp the mold against the pressure of the ram.

6. In apparatus of the character described, an annular pressure chamber, a ring-shaped ram within the pressure chamber, a packing around the inner and outer peripheries of the ram, a ring-shaped pressure plate carried by the ram, a tire mold in register with the plate, and means extending through the opening in the pressure plate adapted to clamp the mold against the pressure of the ram.

OTTO J. KUHLKE.